United States Patent
Brückner et al.

(10) Patent No.: US 7,320,039 B2
(45) Date of Patent: Jan. 15, 2008

(54) METHOD FOR PROCESSING CONSISTENT DATA SETS

(75) Inventors: Dieter Brückner, Unterleiterbach (DE); Franz-Josef Götz, Heideck (DE); Dieter Klotz, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 44 days.

(21) Appl. No.: 10/489,760

(22) PCT Filed: Sep. 19, 2002

(86) PCT No.: PCT/DE02/03521

§ 371 (c)(1),
(2), (4) Date: Mar. 16, 2004

(87) PCT Pub. No.: WO03/028321

PCT Pub. Date: Apr. 3, 2003

(65) Prior Publication Data

US 2004/0236881 A1 Nov. 25, 2004

(30) Foreign Application Priority Data

Sep. 26, 2001 (DE) .............................. 101 47 423
Jul. 4, 2002 (DE) .............................. 102 30 127

(51) Int. Cl.
*G06F 3/00* (2006.01)

(52) U.S. Cl. .............................. 710/5; 707/201; 710/7; 710/20; 710/21; 710/22; 711/141

(58) Field of Classification Search .................... 710/5, 710/60, 117, 124, 52–57, 7, 20–22, 51; 370/353, 370/360, 395.61, 396, 901, 905, 351, 357, 370/100–104; 711/3, 118–122, 141, 168; 707/200–206
See application file for complete search history.

(56) References Cited

U.S. PATENT DOCUMENTS

| | | | | |
|---|---|---|---|---|
| 5,327,428 A | * | 7/1994 | Van As et al. | 370/353 |
| 5,604,742 A | * | 2/1997 | Colmant et al. | 370/396 |
| 5,841,771 A | * | 11/1998 | Irwin et al. | 370/360 |
| 6,088,744 A | * | 7/2000 | Hill | 710/53 |
| 6,181,694 B1 | * | 1/2001 | Pickett | 370/353 |
| 6,490,676 B1 | * | 12/2002 | Cota-Robles | 712/225 |

(Continued)

FOREIGN PATENT DOCUMENTS

DE 42 07 158 A1 10/1992

(Continued)

OTHER PUBLICATIONS

"IEEE Standrd for High Perforamce Serial Bus: IEEE 1394", 1995, pp. 145-157.*

*Primary Examiner*—Alford Kindred
*Assistant Examiner*—Chun-Kuan Lee

(57) ABSTRACT

The invention relates to a method for processing consistent data sets by asynchronous application of a subscriber in an isochronous, cyclical communication system. According to the invention, by connecting a communication memory and a consistency, transmission and reception buffer, copying processes leading ti delay can be kept to a minimum.

5 Claims, 6 Drawing Sheets

U.S. PATENT DOCUMENTS

| | | | |
|---|---|---|---|
| 6,603,625 B1 * | 8/2003 | Hospodor et al. | 360/73.02 |
| 6,651,139 B1 * | 11/2003 | Ozeki et al. | 711/118 |
| 6,691,198 B1 * | 2/2004 | Hamlin | 710/305 |
| 6,744,772 B1 * | 6/2004 | Eneboe et al. | 370/400 |
| 6,847,650 B1 * | 1/2005 | Stone et al. | 370/431 |
| 6,904,475 B1 * | 6/2005 | Fairman | 710/52 |
| 2002/0004799 A1 * | 1/2002 | Gorelik et al. | 702/201 |

FOREIGN PATENT DOCUMENTS

| | | |
|---|---|---|
| DE | 199 28 939 A1 | 1/2001 |
| EP | 1 093 252 A2 | 4/2001 |

\* cited by examiner

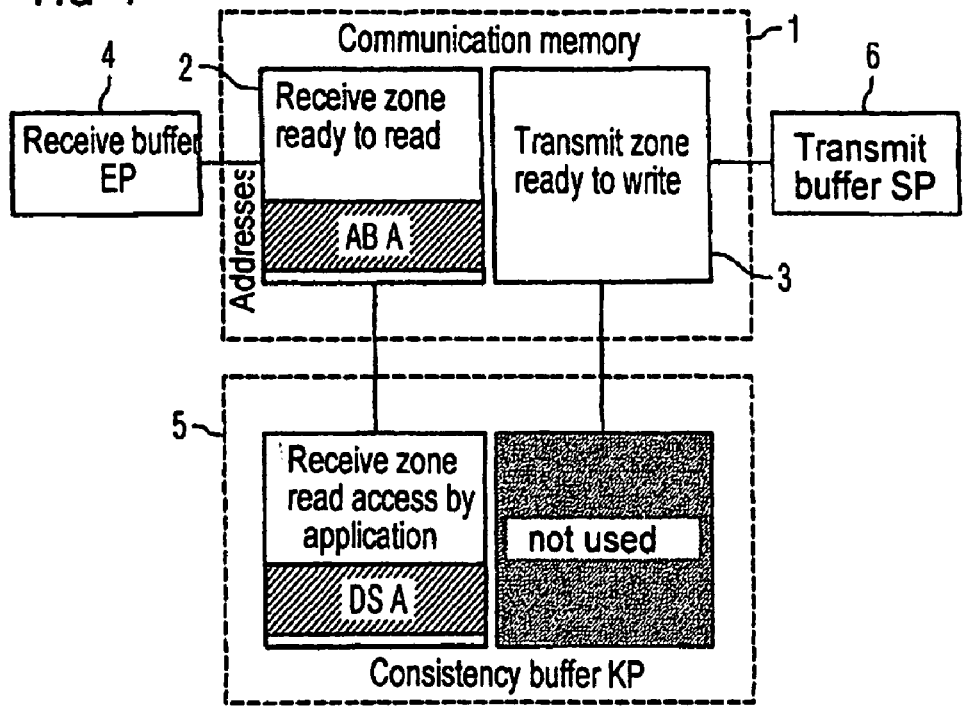

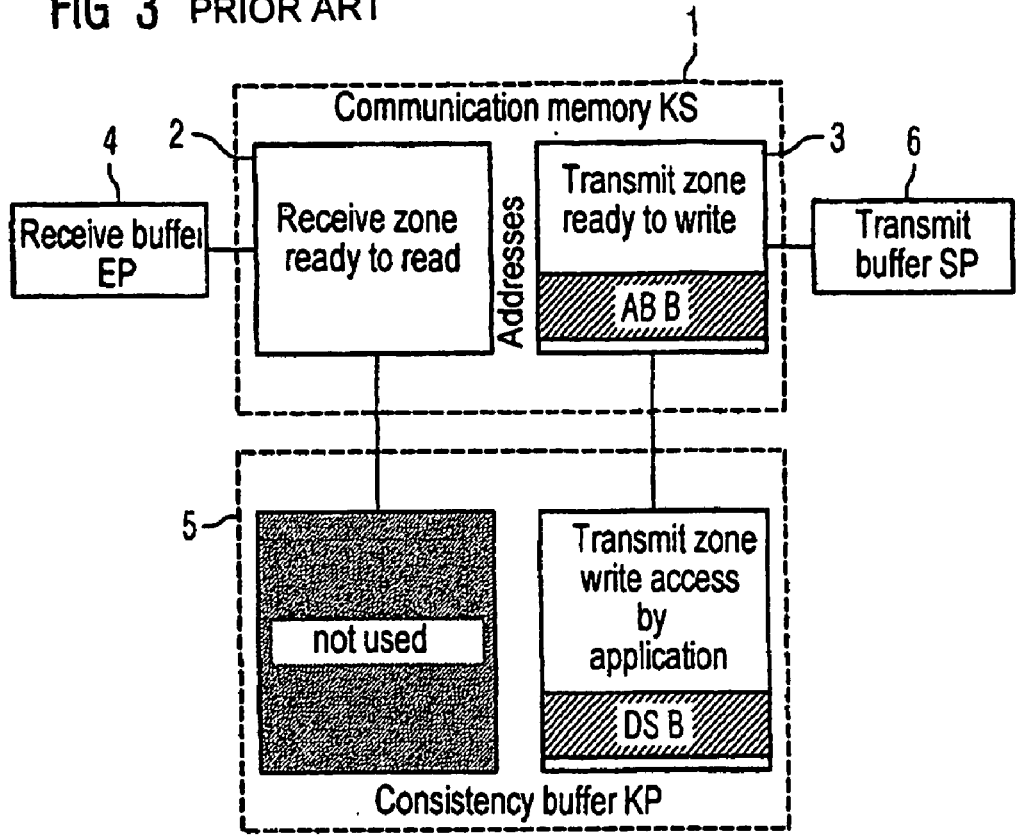

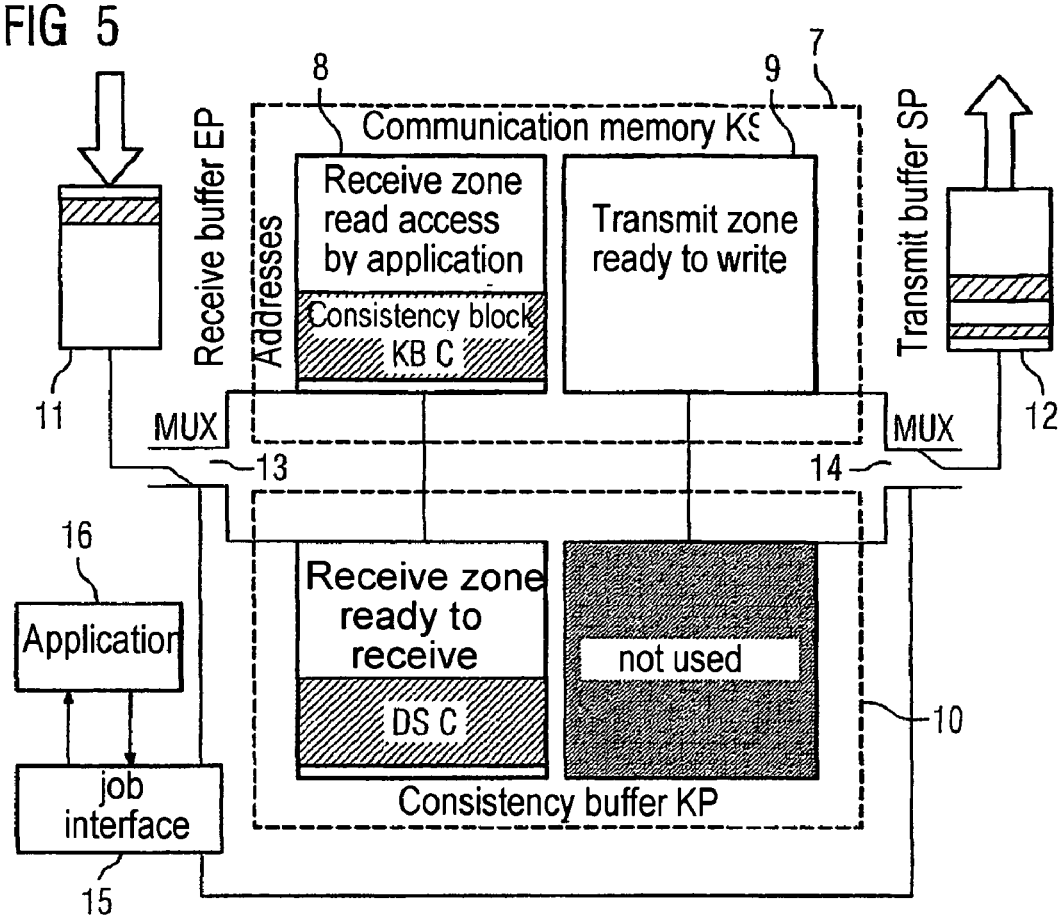

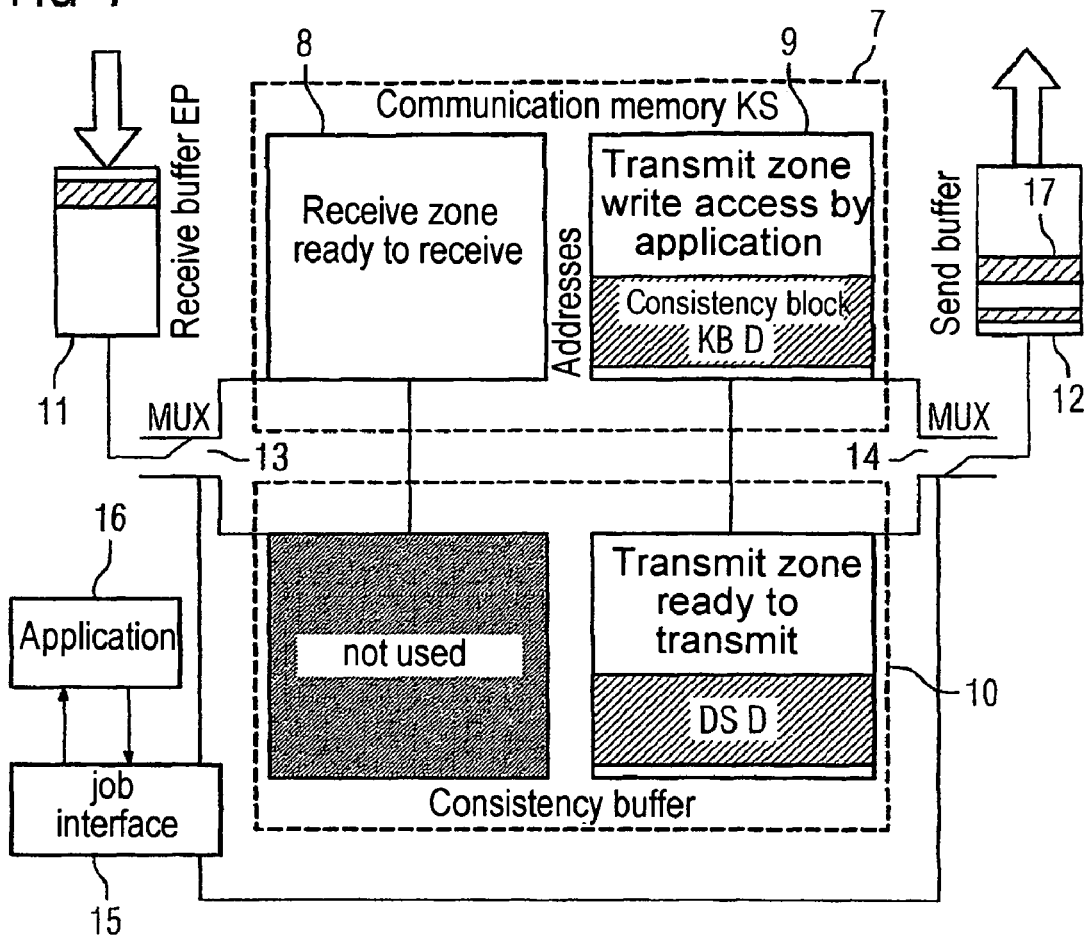

METHOD FOR PROCESSING CONSISTENT DATA SETS

CROSS REFERENCE TO RELATED APPLICATIONS

This application is the U.S. National Stage of International Application No. PCT/DE02/03521, filed Sep. 19, 2002 and claims the benefit thereof. The International Application claims the benefits of German application No. 10147423.7 filed Sep. 26, 2001, and of German application No. 10230127.1 filed Jul. 4, 2002 all three of the applications are incorporated by reference herein in their entirety.

FIELD OF INVENTION

The invention relates to a method for processing consistent data sets by an asynchronous application of a subscriber in an isochronous, cyclical communications system.

BACKGROUND OF INVENTION

Data networks are formed from a number of network nodes and allow communication between a number of subscribers. Communication here means the transmission of data between the subscribers. The data to be transmitted in this case is sent as data telegrams, which means that the data is packed into one or more packets and sent in this form over the data network to the appropriate recipient. The term data packet is thus used. The term transmission of data is used in this document fully synonymously with the above-mentioned transmission of data telegrams or data packets.

For networking in switchable high-performance data networks for example, especially Ethernet, the subscribers are interlinked via coupling nodes. Each coupling node can be connected to more than two subscribers and can also be a subscriber itself. Subscribers are for example computers, Programmable Logic Controllers (PLC) or other machines which exchange electronic data with other machines and especially process it.

In distributed automation systems, for example in the area of drive technology, specific data must arrive at specific times at the intended subscribers and must be processed by the recipients. This is referred to as realtime-critical data or realtime-critical data traffic since if the data does not arrive at its intended destination at the right time this can produce undesired results at the subscriber.

Similarly the use of an isochronous, cyclical communication system is known from the prior art. This is taken to mean a system consisting of at least two subscribers that are linked via a data network for the purposes of mutual exchange of data or mutual transmission of data. In this case data is exchanged cyclically in equidistant communication cycles which are specified by the communication clock used by the system. Subscribers, such as central automation devices, Programmable Logic Controllers, controls, checking units, computers, machines that exchange electronic data with other machines, drives, actors or sensors, execute specific applications. In this document control units are taken to mean closed-loop controllers or control units of all types. Typical examples of communication systems used for data transmission are bus systems such as Field Bus, Profibus, Ethernet, Industrial Ethernet, FireWire or also PC-internal bus systems (PCI), etc. In such systems data telegrams are fed into the data network at fixed points for transmission by a subscriber.

For synchronous applications the processing of the data is synchronized with the communication cycle. By contrast the processing of data in asynchronous applications is not synchronized with the communication cycle. This reading and writing of data by an asynchronous application can occur at any point in time. This produces special requirements for inclusion of an asynchronous application into an isochronous, cyclical communication system. Basically consistent data is to be sent and read by a subscriber. Consistent data is data which relates to the same time interval. Subscribers with asynchronous applications known from the prior art have the consistency buffer and a communication memory. If the application is to process data from a specific address range in the communication memory, this data is first copied into the consistency buffer.

Only then does the application access the data in the consistency buffer to read it. All addresses in the communication memory can thus be overridden while the application works with the consistent data in the consistency buffer.

The application first writes data into the consistency buffer while consistent data can be sent at the same time from the communication memory to further subscribers. After write access by the application and the sending of data has ended the data written in this way is copied from a consistency buffer to the communications memory. The consistent data is stored here for onwards transmission. The copying processes lead to delays in such cases.

FIG. 1 illustrates a system from the prior art for processing consistent data blocks during read access. The communications memory 1 has a receive zone 2 and a transmit zone 3. The receive zone 2 is linked to the receive buffer 4 and the consistency buffer 5. The transmit zone 3 is linked to the consistency buffer 5 and the transmit buffer 6. Data set DS A from address range AB A to which the application has access for reading is located in the consistency buffer.

FIG. 2 illustrates the sequence of read access by the application in the system shown in FIG. 1 Before read access the data set DS A is copied from the receive zone 2 of the communication memory 1 to the consistency buffer 5. Data set A is data which can be or could be accessed by the application during a read access. Data set DS A is to be consistent during a read access and originates from the address range AB A in the receive zone 2 of communication memory 1.

Because the data of the consistency block requests by the application is saved in the consistency buffer, newly received data of receive buffer 4 which lies in the address range of the consistency block can subsequently be stored in the receive zone 2 of communication memory 1. Read access by the application to the data set DS A in the consistency buffer 5 takes place independently of this storage process. During the read access files can be copied from the receive buffer 4 into the receive zone 2 of communication memory 1.

FIG. 3 shows the system from FIG. 1 during a write access by the application.

FIG. 4 illustrates the sequence of a write access by the application. While the application is writing data set DS B into the consistency buffer 5 data is forwarded from the transmit zone 3 of the communication memory 1 to the transmit buffer 6. Data set DS B is to be copied into a specific address range AB B of the transmit zone 5 of the communication memory 1. Before this copying process takes place all data from the address range AB B which is to move during a copying process from the transmit zone 3 to the transmit buffer 6 should be forwarded to the transmit buffer 6. The data set DS B can thus only be copied from the consistency buffer 5 into the transmit zone 3 of the communication memory 1 once both the write access and the forwarding of data from the address range B are completed.

SUMMARY OF INVENTION

The object of the invention is thus to minimize delays which can arise as a result of the necessary copying processes at a subscriber with an asynchronous application into an isochronous cyclical communications system.

The object of the invention is achieved by a method with the features of the Independent Patent claims 1 and 2. Preferred embodiments of the invention are specified in the dependent patent claims.

With the method in accordance with the invention, before it can be read in the asynchronous application, data is advantageously not copied into the consistency buffer. The application accesses the communication memory directly to read the data. During read access data which is destined for an address range in the communication memory to which the application has access or could have access is copied from the receive buffer into the consistency buffer. Only this data will be copied from the consistency buffer to the communication memory at the end of the reader access. A copying process is only needed if data is received during read access from the receive buffer which is addressed to an address range to which the application has access or could have access.

In a further method in accordance with the invention the application writes data directly into the communication memory. Data from an address range to which the application has access or could have access during writing is written into the consistency buffer before write access. Here it is ready for transmission while if the application is writing data to the communication memory. It is advantageous that the forwarding of the data from the consistency buffer to the transmit buffer can be interrupted as soon as write access to the reserved address range has been ended and instead current data can be forwarded from the communication memory to the transmit buffer.

BRIEF DESCRIPTION OF THE DRAWINGS

A preferred exemplary embodiment of the invention is explained in more detail below with reference to the diagrams. The drawings show:

FIG. 1 a block diagram of a system from the prior art during a read access

FIG. 2 a state transition diagram during read access in accordance with the prior art, FIG. 3 a block diagram or a system from the prior art during a write access, FIG. 4 a state transition diagram during write access in accordance with the prior art, FIG. 5 a block diagram of a system in accordance with the invention during a read access, FIG. 6 a state transition diagram during a read access in accordance with the invention, FIG. 7 a block diagram of a system in accordance with the invention during a write access, FIG. 8 a state transition diagram during a write access in accordance with the invention, FIG. 9 a flowchart of read access in accordance with the invention, FIG. 10 a flowchart of write access in accordance with the invention.

DETAILED DESCRIPTION OF INVENTION

Figure 9:
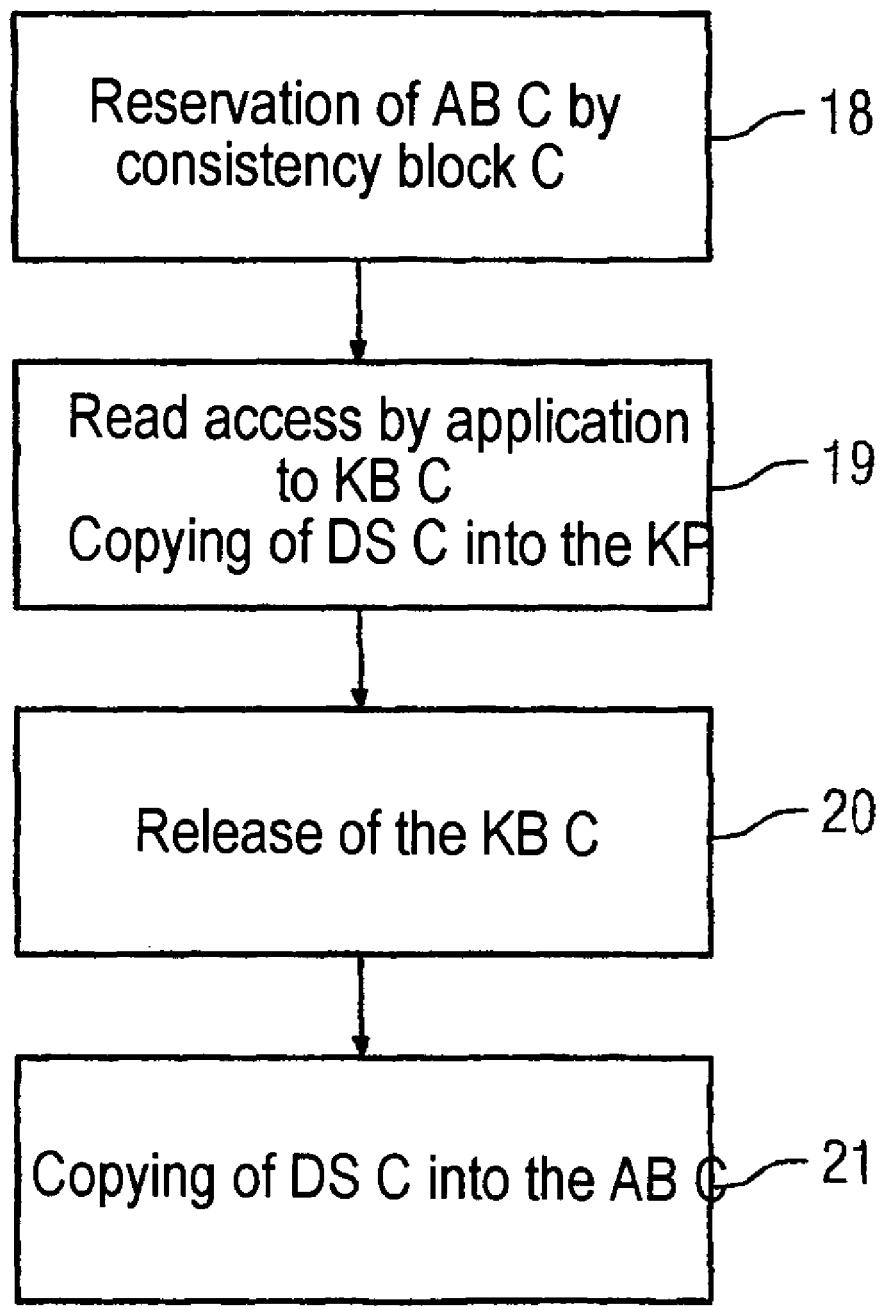

FIG. 5 shows a system in accordance with the invention of a subscriber of an isochronous, cyclical communication system for processing consistent data blocks during a read access. The system in accordance with the invention also possesses a communication memory 7 with a receive zone 8 and a transmit zone 9, a consistency buffer 10, a receive buffer 11 and a transmit buffer 12. The system in accordance with the invention differs significantly from the prior art by linking of the receive buffer 11 and the transmit buffer 12 with the communication memory 7 and the consistency buffer 10. Using the multiplexer 13 a link can be established between both the receive buffer 11 and the consistency buffer 10 and also between the receive buffer 11 and the communication memory 7. Likewise by means of multiplexer 14 an alternative link between the transmit buffer 12 and the communication memory 7 or the consistency buffer 10 can be established. The job interface 15 controls the multiplexers 13 and 14.

In the case shown the application 16 reads data from the address range AB C of the consistency block KB C in the receive zone 8 of the communication memory 7, while data set DS C is being forwarded from receive buffer 11 to consistency buffer 10 which is actually intended for address range AB C. To ensure the consistency of the data read by the application, the data set DS C will thus be copied into the consistency buffer. The job interface 15 controls the multiplexer 13 so that there is a connection between the receive buffer 11 and the consistency buffer 10. The read access has no effect on the forwarding of data from the transmit zone 9 to the transmit buffer 12. The transmit zone 9 is thus connected via the multiplexer 14 to the transmit buffer 12.

The use of the consistency buffer 10 during read access is thus only necessary because the data set DS C is destined for address range AB C to which the application 16 has access or could have access. Otherwise the data can be forwarded directly from the receive buffer 11 to the receive zone 8 of the communication memory 7. The job interface 15 will then establish a connection between at the receive buffer 11 and the receive zone 8.

FIG. 6 illustrates the sequence of read access in accordance with the invention. During read access by the application to the receive zone 8 of the communication memory 7 a data set DS C which is destined for the address range AB C of the consistency block KB C is copied from the receive buffer 11 to the consistency buffer 10. After read access has ended the data set DS C will be copied from the consistency buffer 10 into the receive zone 8 of the communication memory 7. Data is sent and received independently of the read access.

FIG. 7 shows the system from FIG. 5 during a write access. The address range of the consistency block KB D will be writtenby application 16 directly in the transmit zone 9 of the communication memory 7. The data set DS D from the address range of the consistency block KB D is located in the consistency buffer 10. It is advantageous that in transmit buffer 12 a complete set of data 17 is "in stock" for transmission. In stock here means that the set includes all data which is to be transmitted during the next transmit procedure.

FIG. 8 illustrates the sequence of a write access in accordance with the invention in the system of FIG. 7. Before write access by application 16 the data set DS D will be copied from the address range AB D of the consistency block KB D which the application can or could write to during the write access from the transmit zone 9 of the communication memory 7 to the consistency buffer 10. During write access consistent data can be transmitted from a data set DS D from the consistency buffer 10 to the transmit buffer 12. The job interface 15 therefore connects the consistency buffer 10 with the transmit buffer 12.

If write access by the application 16 is ended before the ending of the copying process of data set DS D from the consistency buffer 10 to the transmit buffer 12 the copying process will be aborted. To guarantee the transmission of a complete data set from the transmit buffer 12 a data set 17 must therefore be kept in stock in this.

After the write access data can be forwarded from the address range AB D again and from the transmit zone 9 of the communication memory 7 to the transmit buffer 12. Data which is not located in address range AB D can also be forwarded during write access from the receive zone 9 of the communication memory 9 to the transmit buffer 12. Data can be received independently of write access at the receive port and sent at the transmit buffer 12.

FIG. 9 shows a flowchart of a read access in accordance with the invention. First of all an address range AB C in the receive zone of the communication memory is reserved by a consistency block KB C (step 18). "Reservation by a consistency block" means in this connection that data can neither be copied from the receive buffer into the address range occupied by a consistency block, nor from an address range occupied by a consistency block into the transmit buffer. The address range C includes addresses to which the application has access or could have access during a read access.

In the next step (step 19) the application accesses the consistency block KB C in the communication memory for reading. At the same time the data set DS C which is addressed to addresses in the address range AB C of the consistency block KB C is copied from the receive buffer to the consistency buffer.

After the end of read access the consistency block KB C is released (step 20). The address range AB C can now be written again with data from the transmit buffer.

Data which was written during the read access into the consistency buffer can finally be copied into the address range AB C of the communication memory (step 21).

Figure 10:
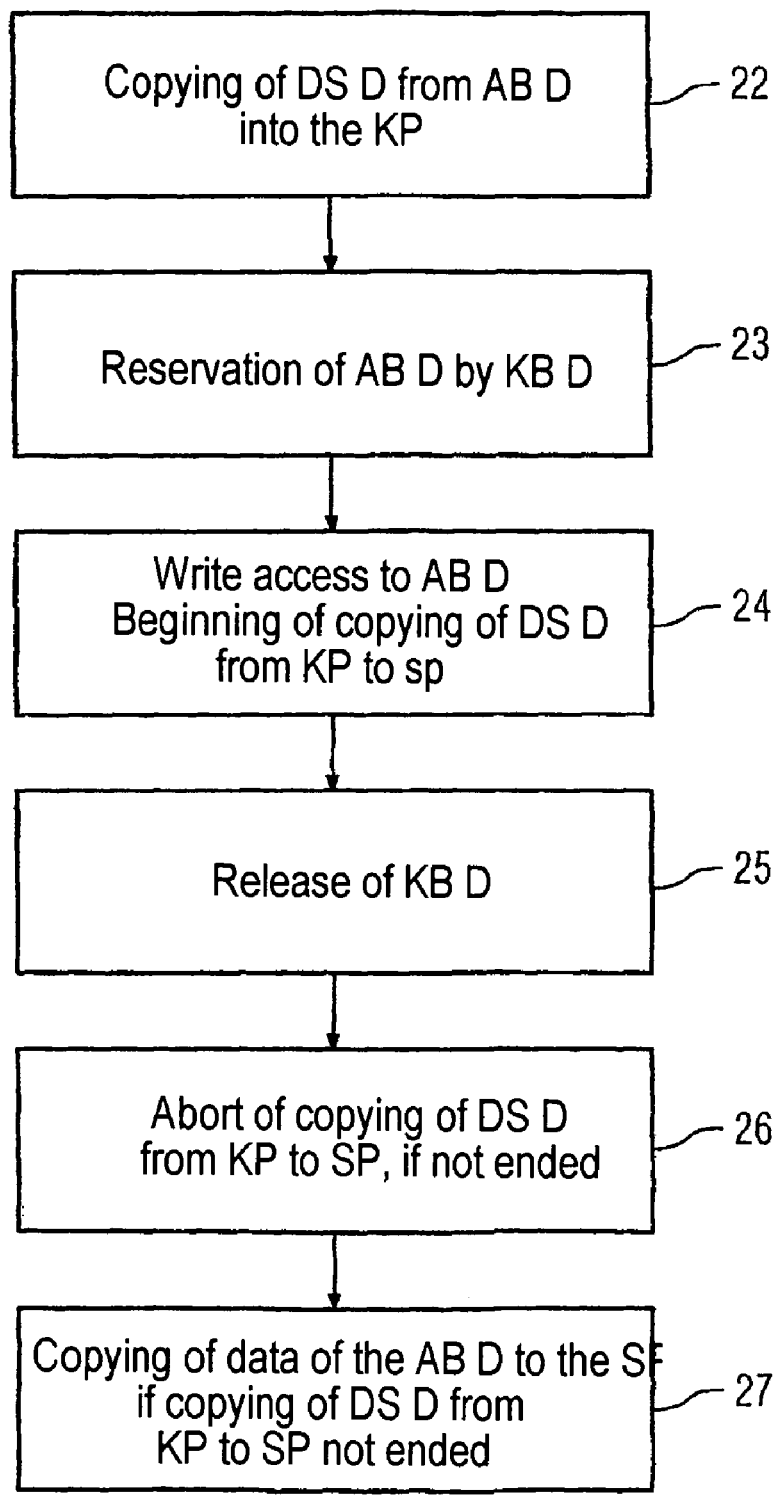

FIG. 10 shows a flowchart of a write access in accordance with the invention. A data set DS D in address range AB D of the transmit zone 9 of the communication memory which is written or could be written by the application during a write access will first be copied into the consistency buffer (step 22).

The address range AB D will then be occupied by the consistency block KB D (step 23). Thus data can no longer be forwarded from the address range AB D to the transmit buffer.

During the write access however data of the data set DS D can be forwarded from the consistency buffer to the transmit buffer (step 24).

After write access has ended the consistency block KB D will be released (step 25). Data can again be forwarded from the address range AB D to the transmit buffer.

The copying process of data of data set DS D from the consistency buffer to the transmit buffer will be aborted if it is not completed before the end of write access (step 26) and replaced by the current data from the communication memory.

A current data record is then copied from the address range AB D of the consistency block KB D to the transmit buffer (step 27).

The invention claimed is:

1. A method for processing consistent data sets in an isochronous, cyclical communications system by an asynchronous application of a subscriber having a transmit buffer, a receive buffer, a communication memory and a consistency buffer, wherein the communication memory has a receive zone and a transmit zone, comprising:
   copying a second data set from a second address range in the transmit zone of the communication memory into the consistency buffer;
   allocating the second address range by a consistency block such that data can no longer be forwarded from the second address range to the transmit buffer;
   writing access by the application directly to the second address range in the transmit zone of the communication memory;
   forwarding data of the second data set from the consistency buffer directly to the transmit buffer during the writing access by the application directly to the second address range in the transmit zone of the communication memory; and
   releasing the consistency block after the writing access has ended, such that data can be forwarded from the second address range in the transmit zone of the communication memory to the transmit buffer.

2. A method in accordance with claim 1 further comprising when the forwarding of data of the second data set from the consistency buffer to the transmit buffer is not concluded when the writing access ends:
   aborting the forwarding of data of the second data set from the consistency buffer to the transmit buffer; and
   forwarding of data from the second address range in the transmit zone of the communication memory directly to the transmit buffer.

3. A subscriber comprising:
   an application;
   a transmit buffer;
   a receive buffer;
   a communication memory comprising a transmit zone;
   a consistency buffer;
   a job interface;
   a device for copying a second data set from a second address range in the transmit zone of the communication memory into the consistency buffer;
   a device for reservation of the second address range in the transmit zone of the communication memory by a consistency block such that data can no longer be forwarded from the second address range in the transmit zone of the communication memory to the transmit buffer;
   a device for writing to the second address range in the transmit zone of the communication memory directly by the application;
   a device for copying data of the second data set from the consistency buffer directly to the transmit buffer;
   a device for copying data from the second address range in the transmit zone of the communication memory directly to the transmit buffer; and
   a device for releasing the consistency block to allow copying of data from the second address range in the transmit zone of the communication memory directly to the transmit buffer after writing to the second address range in the transmit zone of the communication memory directly by the application.

4. A subscriber in accordance with claim 3, wherein the transmit buffer has a complete data set in stock for transmission.

5. A job interface comprising:

an application;

a communication memory comprising a transmit zone;

a consistency buffer;

a transmit buffer connected alternately directly to the communication memory and to the consistency buffer;

a device for copying a second data set from a second address range in the transmit zone of the communication memory into the consistency buffer;

a device for reservation of the second address range by a consistency block to temporarily prevent forwarding of data from the second address range in the transmit zone of the communication memory to the transmit buffer;

a device for writing to the second address range in the transmit zone of the communication memory directly by the application while concurrently forwarding the second data set from the consistency buffer directly to the transmit buffer; and a device for releasing the consistency block to allow forwarding of data from the second address range in the transmit zone of the communication memory to the transmit buffer after the end of writing to the second address range in the transmit zone of the communication memory directly by the application.

* * * * *